C. Stone.

Fruit Frame.

No. 3,710. Reissued Nov. 2. 1869.

Witnesses,
W. H. Fuming
J. Holmes.

Inventor,
Chester Stone

N. PETERS, PHOTO-LITHOGRAPHER, WASHINGTON, D. C.

UNITED STATES PATENT OFFICE.

CHESTER STONE, OF RAVENNA, OHIO.

IMPROVEMENT IN FRUIT-FRAMES.

Specification forming part of Letters Patent No. 74,252, dated February 11, 1868; Reissue No. 3,710, dated November 2, 1869.

*To all whom it may concern:*

Be it known that I, CHESTER STONE, of Ravenna, in the county of Portage and State of Ohio, have invented certain new and useful Improvements in Fruit-Frames, &c.; and I do hereby declare that the following is a full and complete description of the same, reference being had to the accompanying drawings, making a part of this specification, in which—

Figure 1:
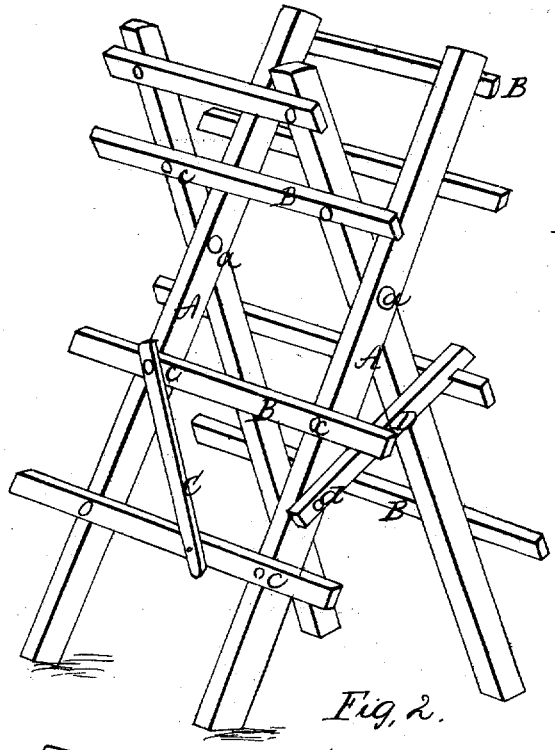
Figure 2:
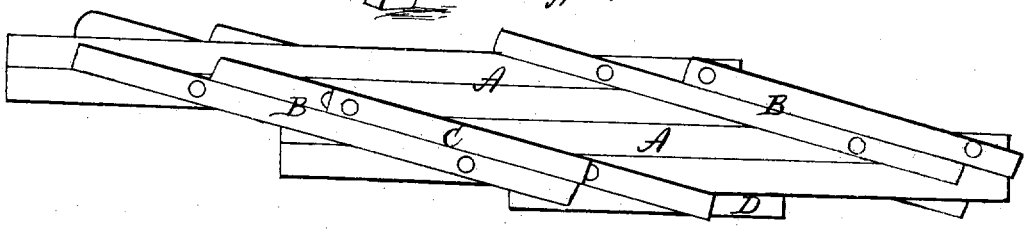
Figure 3:
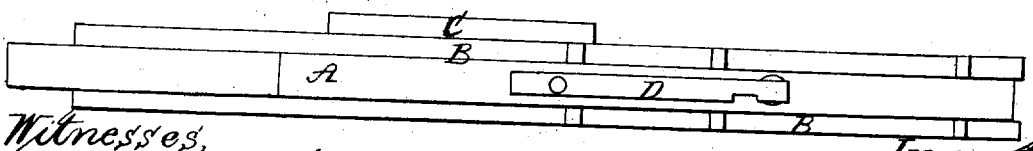

Figure 1 is a perspective view. Fig. 2 is a front view of the frame when closed. Fig. 3 is an edge view of the same.

Like letters of reference refer to like parts in the views.

In the drawings, A A represent the standards, (two on each side,) which are pivoted together, so as to form a point at *a*. These are connected to the two on the opposite side of the frame by means of the cross bars or slats B, which may be more or less in number, according to the size of the frame, and are pivoted to said standards at *c c*, so as to allow the frame to fold. By extending the slats outside the standards a frame of equal capacity folds one-half shorter than without such extension. This extension also gives the slats a counterbalance, and enables them to sustain a much greater weight without sagging or breaking. For the same reason it requires less lumber in manufacture. It also stands much more firmly and squarely on the flooor than if the standards were placed at the ends.

C D are braces, which are to hold and steady the frame, and also prevent it from closing. The brace D is pivoted to the standard A at *d*, the other end being provided with a notch that catches over the slat or bar of the frame, which is spread more or less, as desired, by catching it either on the upper or lower slat.

By placing the brace as shown in the drawings the frame can be spread more than if the brace rested on the lower slat, the brace C being secured to one slat at *e*, and the other end being provided with a pin, which pin passes into a hole in the slat below, thus holding the frame from closing.

When this frame is used, the fruit can be strewed in the usual way, and hung over the slats or bars of said frame; and when not in use the frame can be folded by releasing the braces C D and allowing the standards to be brought together, the standards on each side closing against those on the opposite side. The bars, by being pivoted, as stated, allow them to move; and the frame, when thus folded, is shown in Figs. 2 and 3, which takes up very little room, and is convenient in transportation.

This frame can be used for other purposes than drying fruit--as a clothes-frame, &c.—without changing its construction.

What I claim as my improvement, and desire to secure by Letters Patent, is—

1. The braces C D, in combination with the standards A and slats B, when arranged and pivoted together as described, substantially as and for the purpose set forth.

2. The extension in each direction of the slats B beyond the standards A, as shown and described.

3. The herein-described fruit-frame as a whole, when the several parts thereof are constructed, combined, and arranged as and for the purpose specified.

CHESTER STONE.

Witnesses:

MARVIN C. STONE,
E. P. HATFIELD.